United States Patent

[11] 3,607,412

| [72] | Inventor | Frank Raymond Holloway<br>Sutton Coldfield, England |
|---|---|---|
| [21] | Appl. No. | 776,997 |
| [22] | Filed | Nov. 19, 1968 |
| [45] | Patented | Sept. 21, 1971 |
| [73] | Assignee | Joseph Lucas (Industries) Limited<br>Birmingham, England |
| [32] | Priority | Nov. 27, 1967 |
| [33] | | Great Britain |
| [31] | | 53781/67 |

[54] BATTERY PLATE GRIDS
9 Claims, 6 Drawing Figs.

[52] U.S. Cl. .................................................... 136/66,
136/26, 136/36, 136/67
[51] Int. Cl. ............................................H01m 35/20
[50] Field of Search........................................... 136/66, 67,
36, 37, 38, 35, 54, 58, 26; 264/126

[56] References Cited
UNITED STATES PATENTS

| 2,371,868 | 3/1945 | Berg et al.................... | 264/126 |
|---|---|---|---|
| 3,123,654 | 3/1964 | Malischewski............... | 264/126 |
| 3,202,545 | 8/1965 | Emeriat........................ | 136/28 |
| 3,259,677 | 7/1966 | Zwick........................... | 264/126 |
| 3,269,863 | 8/1966 | Helms.......................... | 136/36 |
| 3,301,929 | 1/1967 | Bruun........................... | 264/126 |
| 3,438,912 | 4/1969 | Tsukamoto et al. .......... | 264/126 |
| 3,350,238 | 10/1967 | Wilson ........................ | 136/80 |
| 3,420,714 | 1/1969 | Knight.......................... | 136/107 |

*Primary Examiner*—Winston A. Douglas
*Assistant Examiner*—C. F. Lefevour
*Attorneys*—Glascock, Downing & Seebold and Holman & Stern ABSTRACT: A method of manufacturing a battery plate grid includes the steps of, placing a conductive battery plate lug having an extension integral therewith in a mould containing an impression of the battery plate grid to be produced. The remainder of the mould is then filled with particles of a synthetic resin material, and the material is heated without the application of pressure, to cause the particles of resin material to adhere to one another. The shape of said extension of the lug is such that the extension is trapped by the resin material. The grid is then removed from the mould and is rendered conductive.

INVENTOR
Frank Raymond Hollaway
BY
ATTORNEYS

BATTERY PLATE GRIDS

This invention relates to a method of manufacturing battery plate grids.

A method according to the invention includes the steps of placing a conductive battery plate lug having an extension integral therewith in a mould containing an impression of the battery plate grid, filling the remainder of the mould with particles of a synthetic resin material, heating the material, without the application of pressure, to cause the particles of resin material to adhere to one another, the shape of said extension being such that it is trapped by the resin material, removing the grid from the mould and rendering the grid conductive.

In a second aspect a method according to the invention includes the steps of placing a conductive battery plate lug having an extension integral therewith in a mould containing an impression of the battery plate grid, filling the remainder of the mould with particles of a synthetic resin material, heating the material without the application of pressure to cause the particles of the synthetic resin material to adhere to one another and entrap the extension of said lug, the material being heated to such a temperature that entrapped air is driven from the synthetic resin material leaving the synthetic resin members of the grid with a substantially nonporous inner region and a pitted surface, removing the grid from the mould, and coating the grid with conductive material so that said lug is electrically connected to the coating of conductive material, said conductive material entering the asperities in the surface of the synthetic resin members of the grid to key the conductive coating to the grid.

The invention further resides in a battery plate grid comprising, a synthetic resin mesh network, the members of which include an inner, substantially nonporous region and a pitted surface, a conductive battery plate lug including an integral extension which is embedded in the synthetic resin, and a conductive coating on the members of the mesh network, said conductive coating being electrically connected to said lug and entering the asperities in the surface of the synthetic resin members of the grid so that the conductive coating is keyed to the grid.

One example of the invention is illustrated in the accompanying drawings wherein.

Figure 1:
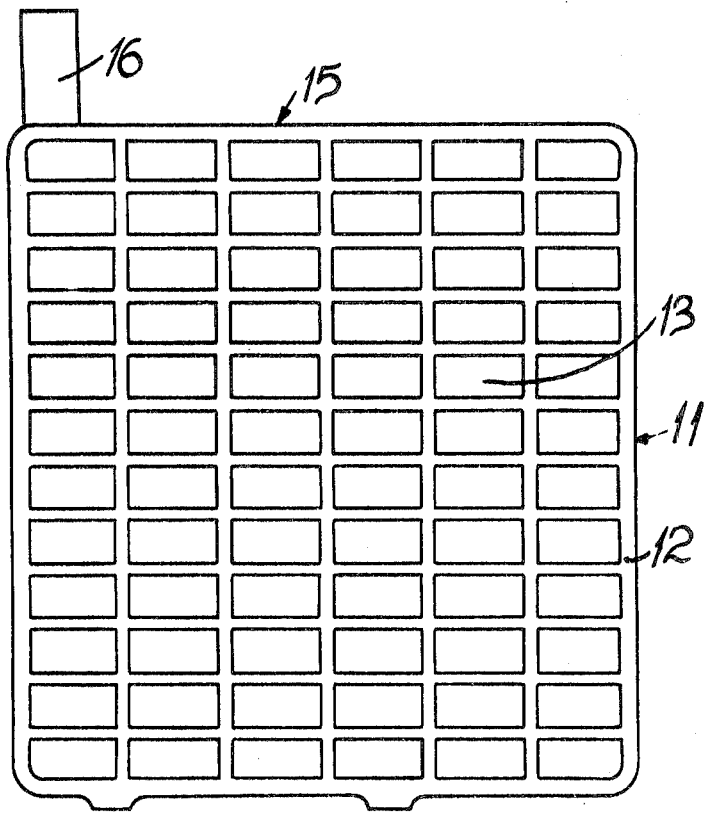
FIG. 1 is a plan view of a battery plate grid.
Figure 2:
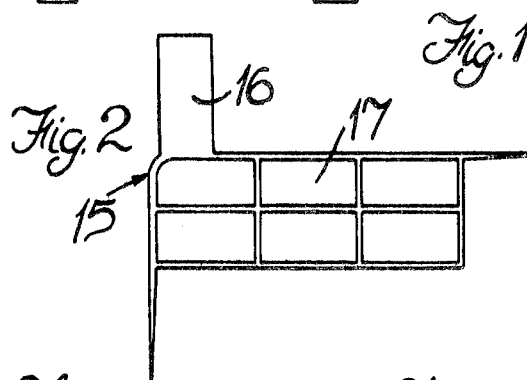
FIG. 2 is a plan view of a lead part of the grid shown in FIG. 1.

Referring first to FIGS. 1 and 2 of the drawings, it is desired to produce a battery plate grid 11 having a rectangular frame 12 the limbs of which are interconnected by a mesh network 13 of vertical and horizontal members. The limbs of the frame 12 are 4½ inches long and are 3/16 inches wide and the members of the mesh network 13 are ⅛ inches wide. The grid 11 is moulded in an aluminum mould which is formed by engraving the impression of the whole grid in a plane surface of an aluminum block, of width 6 inches, length 7⅜ inches and thickness ½ inch.

The production of the grid is as follows.

The aluminum mould is first coated with a thin layer of polytetrafluorethylene by a spraying technique, the layer of p.t.f.e. serving to prevent the formed grid subsequently adhering to the mould. A lead part 15 defining the grid connector lug 16 which is ½ inch wide and 3/16 inches thick and which has integral therewith a portion 17 of the grid itself which is of reduced cross section is then engaged in the impression of the grid in the mould and the remainder of the mould is filled with particles of polyvinylchloride. The p.v.c. is in the form of hollow spherical particles having an average particle size of 30 microns such as that sold by I.C.I. under the trade name CORVIC H65/36B, together with fragments of such particles.

Figure 6:
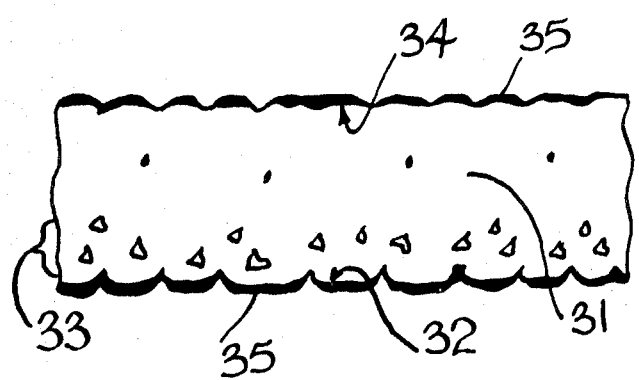
FIG. 6 is an enlarged sectional view of part of the grid shown in FIG. 1.

A flat bar is now drawn across the plane surface of the mould to remove any excess p.v.c. from the mould and to spread the p.v.c. evenly into all parts of the mould, including the parts of the mould occupied by the lead part. The mould is then positioned horizontally in an oven at 240° C. for approximately 20 minutes to cause the p.v.c particles to adhere to one another and trap the lead part 15, the 20 minute period during which the mould is in the oven being constituted by a period of approximately 17½ minutes during which the mould heats up and a further period of approximately 2½ minutes during which the particles adhere to one another. The temperature of the oven is considerably above the temperature at which p.v.c. particles sinter, and is such that air entrapped within the synthetic resin is driven off leaving the p.v.c. members of the grid with a substantially nonporous inner region 31 and a pitted surface (FIG. 6).

The whole of the surface of the p.v.c. members is pitted, but the pitting of the surface is more pronounced in the area 32 of the surface, which is in contact with the mould during heating. It is believed that this effect results from the action of the mould as a heat sink. It is believed that the p.v.c. particles adjacent the mould are maintained at a lower temperature than those exposed at the surface of the mould. Thus the particles of p.v.c. adjacent the surface of the mould tend to sinter to produce a porous region 33 (FIG. 6) while the remaining particles melt. Most of the entrapped gas then bubbles up through the molten p.v.c. to leave a substantially bubble free inner region, the bubbles of gas bursting at the exposed surface of the p.v.c. thereby leaving the exposed surface 34 pitted upon cooling.

The mould is then removed from the oven, allowed to cool to 70° C. and then if necessary is lightly brushed to remove any flash. The mould is then allowed to cool to room temperature whereupon the formed grid is removed from the mould.

Since prior to heating the mould, the p.v.c. is spread in the mould by drawing a bar across the mould, one ace of the limbs and mesh network members of the grid will be substantially flat and coplanar. However, it is found that it is advantageous to shape the mould so that the edges of the opposite faces of the limbs and members of the grid have a radius of 1/16 inches.

It will be appreciated that only the lead part of the formed grid is conductive and so the remainder of the grid must be rendered conductive prior to use. The p.v.c. portion of the grid is, of course, rendered conductive by coating the grid with conductive material, the preferred method being to spray the grid using an atomizing spray gun, with molten lead or lead alloy. The molten lead or lead alloy sprayed onto the grid enters the asperities of the pitted surface of the p.v.c. members of the grid thereby keying the lead or lead alloy coating 35 (FIG. 6) to the grid. The lead, or lead alloy coating makes electrical connection with the lead lug.

It will be appreciated that since the surface of the grid is pitted when the grid is removed from the mould then there is no need to perform a surface roughening process before the grid is coated with lead, as is found necessary in a previous process. In said previous process the grid is formed by injection moulding synthetic resin material, and the moulded grid is sand blasted to roughen the surface of the grid to provide a key for the lead coating.

In order to further enhance the electric connection of the lead coating to the lead part of the grid, the lead part is formed with upstanding regions which project from the p.v.c. portion of the grid and so are coated directly with lead or lead alloy during the spraying operations.

Figure 3:
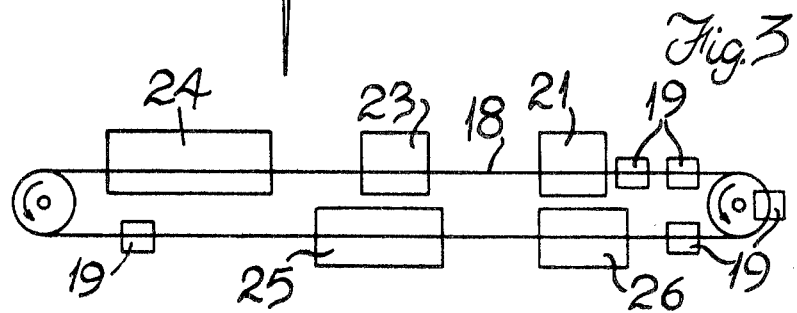
FIG. 3 is a block diagram of part of a grid manufacturing plant.
Figure 5:
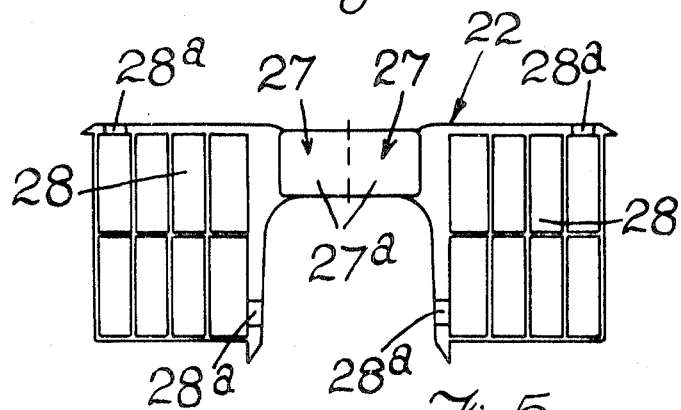
FIG. 5 is a view similar to FIG. 1 of the lead part of the pair of grids shown in FIG. 4.

FIG. 3 illustrates part of a plant for the continuous production of battery plate grids. The plant includes a conveyor 18 carrying a plurality of aluminum moulds 19 each of which contains an impression of a pair of battery plate grids. Empty moulds 19 first pass through a filling station 21 wherein a lead member 22 (FIG. 5) constituting a pair of interconnected battery plate lugs is inserted into each mould, and wherein each mould is then filled with p.v.c. in the form of hollow spherical particles having an average particle size of 30 microns. The filled grids then pass through a levelling station 23 wherein the moulds pass under a flat bar which removes any excess p.v.c. from the mould, and which spreads the p.v.c. evenly into all parts of the mould, including the parts of the mould occupied by the lead member 22. The moulds containing the p.v.c. then pass horizontally through an oven 24 which is maintained at a temperature of 240° C. The speed of the conveyor is such that the moulds remain in the oven for a period of 6 minutes during which time the p.v.c. particles adhere to one another and to the lead member 22, and entrapped air is driven off to leave the p.v.c. members of the grid with a substantially nonporous inner region and a pitted surface. The moulds 19 then pass from the oven, and are allowed to cool to 70° C. whereupon they pass into a brushing station 25 wherein the moulds are brushed to remove any flash from the grids. The brushed moulds then pass through a removing station 26 wherein the pairs of interconnected grids are removed from the moulds, and whereafter the moulds 19 are returned to the filling station 21.

It will be appreciated that the moulds 19 do not cool much below 70° C. since they are almost immediately refilled and passed through the oven 24 again. Moreover, the moulds 19 are made as thin as possible, each mould being between 1/16 and 5/64 of an inch thick. Thus, the time required to heat the moulds to 240° C. is reduced as compared with that described above.

Each of the lead members 22 (FIG. 5) includes a pair of integral lugs 27, each of which has integral therewith a portion 28 of a grid. The members 22 are formed with raised portions 27a, 28a which are wiped free of p.v.c. in the levelling station 23, and so are exposed.

Figure 4:
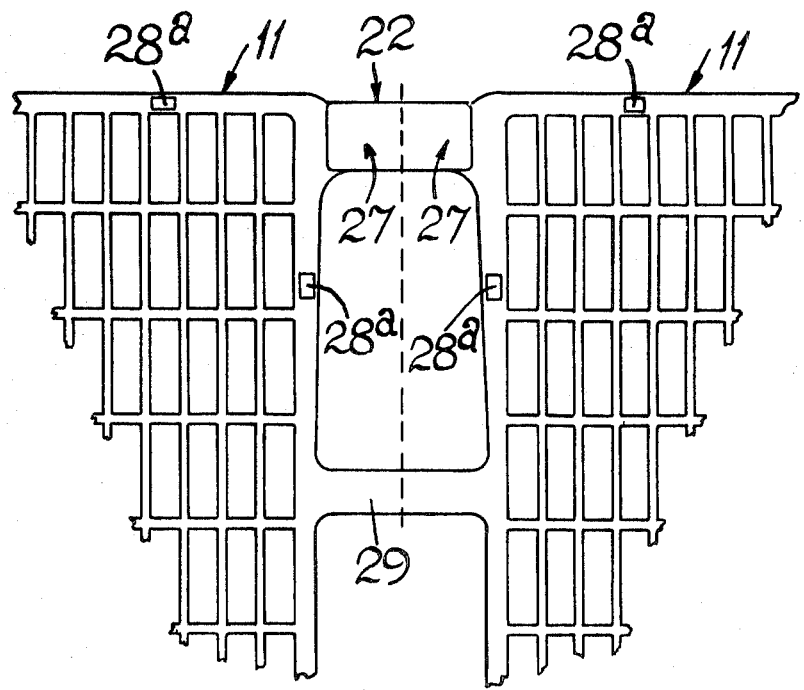
FIG. 4 is a view similar to FIG. 1 of part of a pair of grids.

The pair of grids (FIG. 4) which are removed from each mould, are interconnected both by the respective member 22, and by an integral p.v.c. bridging piece 29. The pair of grids is then rendered conductive by spraying the pair of grids with molten lead or lead alloy. As described above, the molten lead or lead alloy enters the asperities in the surface of the p.v.c. members of the grids thereby keying the lead or lead alloy coating to the grid. The portions 27a, 28a of the member 22 are of course coated directly with the lead or lead alloy during the spraying operation, thereby enhancing the electrical connection of the lead or lead alloy coating to the member 22.

It will be appreciated that the substantially non-porous region of the members of the grid impart strength and rigidity to the grid.

The completed grids are then passed onto a pasting station wherein the grids are coated with a layer of active material in the form of a paste, which is then skin dried.

The pair of pasted grids are then separated from one another by severing the lead member 22 and the bridging piece 29, so that each grid includes a projecting lead lug 27. The projecting portions of the bridging member 29 may then be severed from the grids if desired.

Since the lead, or lead alloy coating enters the asperities in the surface of the grid the coating will have a pitted surface which provides a good key for the active material.

Having thus described my invention what I claim as new and desire to secure by Letters Patent is:

1. A method of manufacturing a battery plate grid including the steps of placing a conductive battery plate lug having an extension integral therewith in a mould containing an impression of the battery plate grid, filling the remainder of the mould with particles of a synthetic resin material, heating the material without the application of pressure to cause the particles of the synthetic resin material to adhere to one another and entrap the extension of said lug, the material being heated at such a temperature and for such a time that entrapped air is driven from the synthetic resin material leaving the synthetic resin members of the grid with a nonporous inner region and (a) pitted surfaces removing the grid from the mould, and coating the grid with conductive material so that said lug is electrically connected to the coating of conductive material, said conductive material entering the asperities in the surfaces of the synthetic resin members of the grid to key the conductive coating to both surfaces of the grid.

2. A method as claimed in claim 1 wherein the grid is coated with conductive material by spraying the conductive material onto the grid.

3. A method as claimed in claim 2 wherein said conductive material is molten lead or lead alloy.

4. A method as claimed in claim 1 wherein the battery plate grid is in the form of a mesh network and said extension of the conductive battery plate lug is in the form of a section of the mesh network of the grid, the members of said portion being surrounded by synthetic resin material.

5. A method as claimed in claim 1 including the step of wiping the surface of the mould after the mould has been filled with synthetic resin material, and prior to heating the mould, to spread the synthetic resin material evenly in the mould and to remove excess synthetic resin material from the mould.

6. A method as claimed in claim 5 wherein said lug is formed with raised regions which are left free of synthetic resin material when the mould is wiped.

7. A method as claimed in claim 1 wherein the mould is formed from aluminum.

8. A method as claimed in claim 1 wherein the synthetic resin particles are particles of polyvinylchloride.

9. A method as claimed in claim 8 wherein said particles of polyvinylchloride are hollow and generally spherical.